C. A. JACQUES.
SPEED INDICATOR.
APPLICATION FILED JULY 17, 1907.
914,145.
Patented Mar. 2, 1909.
2 SHEETS—SHEET 2.
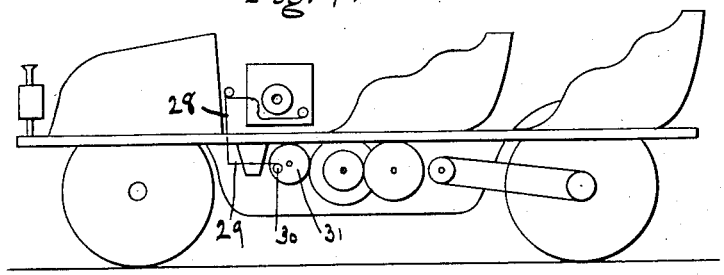
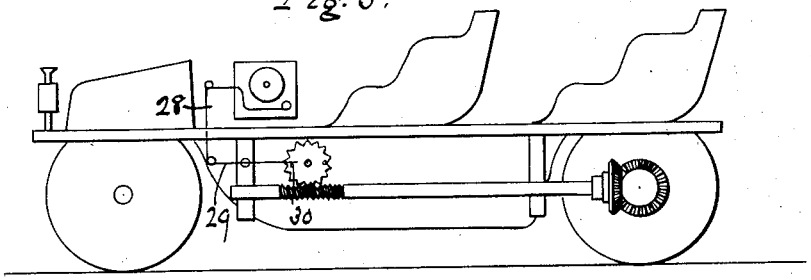
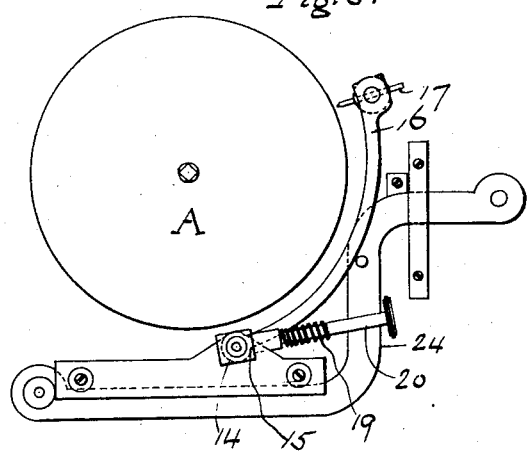
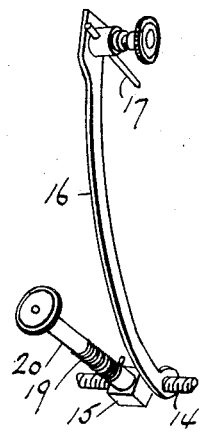
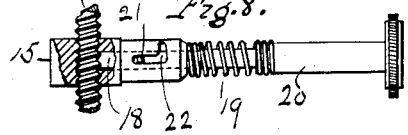
WITNESSES
INVENTOR
Charles A. Jacques
BY
Howson and Howson
ATTORNEYS

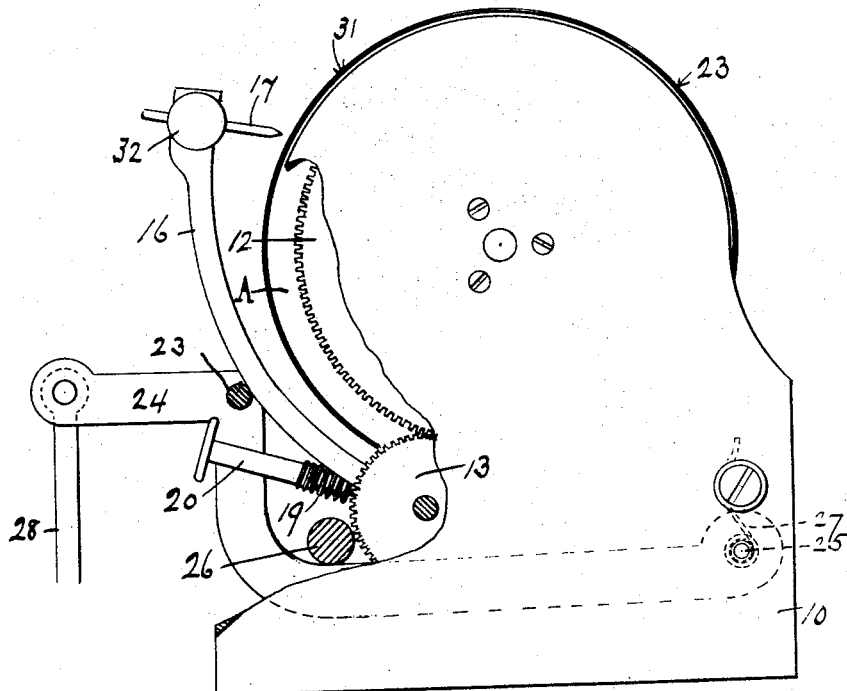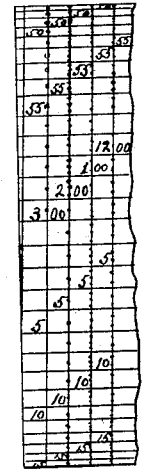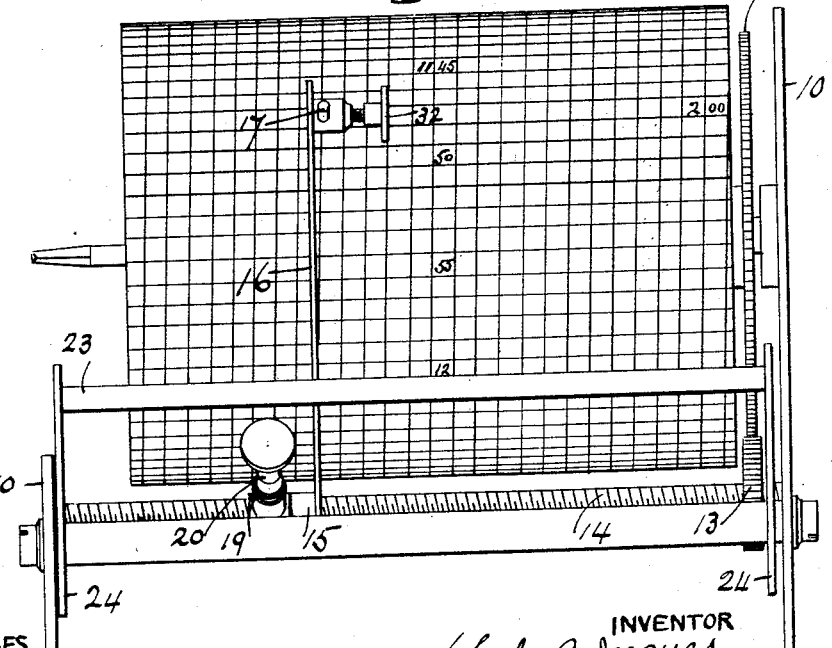

UNITED STATES PATENT OFFICE.

CHARLES A. JACQUES, OF NEW YORK, N. Y., ASSIGNOR TO VELOCHRONE COMPANY, OF NEW YORK, N. Y., A CORPORATION OF NEW YORK.

SPEED-INDICATOR.

No. 914,145.      Specification of Letters Patent.      Patented March 2, 1909.

Application filed July 17, 1907. Serial No. 384,188.

*To all whom it may concern:*

Be it known that I, CHARLES A. JACQUES, a citizen of the United States of America, residing in the borough of Manhattan, in the city, county, and State of New York, have invented certain new and useful Improvements in Speed-Indicators, of which the following is a specification.

This invention relates to speed indicators and particularly to automatically recording indicators.

The object of the invention is to provide an indicator in which, in connection with a drum revolved at a constant known speed, is arranged a recorder actuated from a moving part of the vehicle, the speed of which is to be measured. The apparatus is arranged to serve the purpose of a clock also, the recorder arm acting as a minute hand. In this connection the drum surface is regularly divided and plotted to indicate hours and minutes so that by the movement of the recorder arm and the drum surface, not only the speed at which the vehicle is moving may be seen but the hour told at a glance.

In the accompanying drawings in which my invention is illustrated Figure 1 is an end elevation of the indicator, partly broken away: Fig. 2 is a front elevation of the same: Fig. 3 is a portion of the drum surface to show the plotting of the same and the record made thereon. Figs. 4 and 5 are side elevations of an automobile showing different methods of actuating the recorder arm. Fig. 6 is a side elevation of the indicator from the opposite end from Fig. 1. Fig. 7 is a perspective view of the recorder arm, and Fig. 8 is a plan of the same partly broken away.

Referring to the drawings it will be seen that I provide a hollow drum A mounted in end plates 10 and rotated at constant speed by any suitable mechanism, such as clock mechanism which may be conveniently arranged within the drum and operatively connected thereto.

At one end of the drum I secure a toothed wheel 12 which meshes with a toothed wheel 13 on the threaded shaft 14, journaled in the end plates 10. The axis of this shaft or feed screw is parallel to that of the drum, and its purpose is to feed the carrier 15 mounted thereon, with the recorder arm 16 and point 17 in a direction longitudinal of the drum. For this purpose the carrier is provided with a segment 18 threaded to mesh with the thread of the feed screw, with which it is in contact during the operation of the apparatus. The segment may be withdrawn from its gear with the feed screw in any suitable manner as by pulling the same against the action of the spring 19, one end of which is secured to the carrier and the other to the segment rod 20 and it may be locked in this position by turning the same so that the peg 21 on the rod engages in the lateral slot 22 in the carrier. It is thus possible to move the carrier from one end of the feed screw to the other or to adjust its position thereon as desired.

Around the drum is placed a removable shell 23 made of paper or any suitable material upon which is printed a scale comprising peripheral lines to indicate hours and axial lines to indicate minutes. The axial minute lines shown in Figs. 2 and 3 are so spaced as to divide the circumference of the drum into 59 parts while the rotation of the drum is so calculated that the circumference moves past the point 17 at the rate of one division a minute, or $1\frac{1}{59}$ revolutions per hour. During the revolution of the drum the recorder arm 16, actuated by the feed screw 14, moves longitudinally one space, following the peripheral hour line which is arranged spirally on the scale.

If the hours and minutes are printed on the scale as indicated in the drawings, it will be readily seen that the time consumed in the journey may be readily ascertained, and even the time of day told if the recorder arm is properly placed upon the drum at the beginning of the run.

The recorder arm 16 and its carrier 15 are arranged on the feed screw 14 so as to have a limited free angular movement. The lower portion rests against a finger bar 23 carried by an elbow lever 24, pivoted on the axis 25. This elbow lever is held up against a stop 26 by a suitably arranged spring, as for instance the coil spring 27 surrounding the axis 25. When the apparatus is in this position the point 17 is in proximity to but not touching the scale on the face of the drum.

To secure a record, the elbow lever is drawn down against the action of the spring 27 by means of a rod 28 pivotally connected thereto at one end and at the other end, to one of the arms of the pivoted lever 29. The other end of this lever 29 is subjected to the action of the stops 30 on the wheel 31, which is actuated in any suitable way from a moving part of the vehicle, as for instance by a train of gear wheels operated from the rear shaft (Fig. 4) or by a bevel gear shaft (Fig. 5). As soon as the stop 30 releases the end of the lever 29, the lever 24 which has been drawn down by the movement of the lever 29, flies back against the stop 26 under the influence of the spring 27. The impetus of this return stroke throws the arm 16 free of its rest upon the finger bar 23 and the point 17 makes a record upon the scale. When the point 17 is merely a pricking point as shown, it is advisable to arrange a rubber cushion 31 beneath the scale so that the point shall not be dulled in making the record. It may of course be adjusted or removed for sharpening at any time by the manipulation of the securing screw 32.

In illustration of the manner in which a record is made, suppose the wheel 31 is provided with a single stop and revolves once for every 250 meters traveled. If the speed of the vehicle does not exceed 500 meters per minute, it follows that there will be two pricks of the point 17 in a single axial division on the scale. An increase or decrease of speed, is followed by an increase or decrease in the number of pricks per division as shown, (Fig. 3) since the speed of rotation of the drum is maintained constant by the clock mechanism, while the speed of revolution of the wheel 31 varies with the speed of the vehicle.

I claim as my invention:

In a speedometer, a recording drum, spring actuated gearing located within the same for driving said drum at a constant speed, a scale provided with time divisions extending substantially the length of said drum, a pivoted marker and means for traveling the same lengthwise of the drum at a speed correlated to that of the rotation of the drum, a spring actuated pivoted rest supporting said marker out of contact with said drum, a stop against which said rest is held by the action of its spring and means in connection with a moving part of the machine the speed of which is to be ascertained for moving said rest against the tension of its spring.

In testimony whereof I have signed my name to this specification, in the presence of two subscribing witnesses.

CHARLES A. JACQUES.

Witnesses:
WALTER ABBE,
WILLIAM ABBE.